(12) United States Patent
Kawakami

(10) Patent No.: US 12,679,500 B2
(45) Date of Patent: Jul. 14, 2026

(54) MOTOR UNIT AND ELECTRIC BICYCLE

(71) Applicant: Panasonic Intellectual Property Management Co., Ltd., Osaka (JP)

(72) Inventor: Masafumi Kawakami, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 523 days.

(21) Appl. No.: 18/039,024

(22) PCT Filed: Nov. 24, 2021

(86) PCT No.: PCT/JP2021/042962
§ 371 (c)(1),
(2) Date: May 26, 2023

(87) PCT Pub. No.: WO2022/118705
PCT Pub. Date: Jun. 9, 2022

(65) Prior Publication Data
US 2024/0101220 A1      Mar. 28, 2024

(30) Foreign Application Priority Data
Dec. 2, 2020     (JP) ................................. 2020-200496

(51) Int. Cl.
B62M 6/55          (2010.01)
B62J 43/13          (2020.01)
(Continued)

(52) U.S. Cl.
CPC ................ B62M 6/55 (2013.01); B62J 43/13 (2020.02); B62J 43/28 (2020.02); B62M 6/50 (2013.01); B62M 6/90 (2013.01); B62M 9/04 (2013.01)

(58) Field of Classification Search
CPC . B62M 6/55; B62M 6/50; B62M 6/90; B62M 9/04; B62J 43/13; B62J 43/28; B62J 45/411
See application file for complete search history.

(56) References Cited

U.S. PATENT DOCUMENTS

2018/0093585 A1      4/2018   Suzuki et al.
2020/0269950 A1 *    8/2020   Cheng ..................... B62M 6/55
(Continued)

FOREIGN PATENT DOCUMENTS

DE      102022104398 A1 *   9/2022   .............. B62M 6/55
DE      102023200138 A1 *   8/2023   .............. B62M 6/55
(Continued)

OTHER PUBLICATIONS

International Search Report for corresponding Application No. PCT/JP2021/042962, mailed Jan. 25, 2022.
(Continued)

*Primary Examiner* — Drew J Brown
(74) *Attorney, Agent, or Firm* — RENNER, OTTO, BOISSELLE, & SKLAR

(57) ABSTRACT

A motor unit includes: a case; a motor housed in the case; an input shaft; an output body; and a speed reducer mechanism. The input shaft penetrates through the case in an axial direction and is arranged to be rotatable around an axis defining the axial direction. The output body is arranged in the case to be rotatable around the axis. The speed reducer mechanism is housed in the case and reduces a rotational speed of the motor and transmits rotational force with the rotational speed thus reduced to the output body. The speed reducer mechanism includes only one pair of gears meshing with each other.

19 Claims, 14 Drawing Sheets

(51) Int. Cl.

| | | |
|---|---|---|
| *B62J 43/28* | (2020.01) | |
| *B62M 6/50* | (2010.01) | |
| *B62M 6/90* | (2010.01) | |
| *B62M 9/04* | (2006.01) | |

(56)                      References Cited

U.S. PATENT DOCUMENTS

| | | | |
|---|---|---|---|
| 2021/0061409 A1* | 3/2021 | Ricco ..................... | B62L 1/005 |
| 2022/0128126 A1* | 4/2022 | Schmitz ................ | B62M 11/06 |

FOREIGN PATENT DOCUMENTS

| | | | | |
|---|---|---|---|---|
| EP | 2998211 A1 | 3/2016 | | |
| JP | 2014-196036 A | 10/2014 | | |
| JP | 2018-058497 A | 4/2018 | | |
| JP | 2024168592 A * | 12/2024 | .............. | B62M 6/55 |
| TW | M448447 U * | 3/2013 | .............. | B62M 6/55 |
| WO | 2014/184826 A1 | 11/2014 | | |
| WO | WO-2019176649 A1 * | 9/2019 | ............ | B62J 45/421 |

OTHER PUBLICATIONS

Written Opinion for corresponding Application No. PCT/JP2021/042962, mailed Jan. 25, 2022.

* cited by examiner

MOTOR UNIT AND ELECTRIC BICYCLE

TECHNICAL FIELD

The present invention relates to a motor unit and an electric bicycle.

BACKGROUND ART

An electric assist bicycle equipped with a motor driving unit is known in the art (see, for example, Patent Literature 1). The motor driving unit of Patent Literature 1 includes a unit case, a motor, a crank shaft, an interlocking mechanism fitted into a sprocket, and a speed reducer mechanism.

The speed reducer mechanism includes two pairs of gears. One of the two pairs of gears includes: a teeth part turning integrally with the rotary shaft of a motor; and a larger-diameter gear part meshing with the teeth part. The other pair of gears includes: a smaller-diameter gear part turning integrally with the larger-diameter gear part; and a larger-diameter gear part of the interlocking mechanism meshing with the smaller-diameter gear part.

The electric-assist bicycle described above is designed to reduce speed by so-called "double reduction" mechanism in which the speed reducer mechanism includes two pairs of gears. This increases the chances of causing a decline in the power transmission efficiency of the speed reducer mechanism and a decrease in the degree of quietness to make it difficult to downsize the unit case.

CITATION LIST

Patent Literature

Patent Literature 1: WO 2014/184826 A1

SUMMARY OF INVENTION

In view of the foregoing background, it is therefore an object of the present disclosure to provide a motor unit and an electric bicycle, both of which may reduce the chances of causing a decline in the power transmission efficiency of the speed reducer mechanism, increase the degree of quietness, and make it easier to downsize the unit case.

To overcome the problem described above, a motor unit according to an implementation includes: a case; a motor housed in the case; an input shaft; an output body; and a speed reducer mechanism. The input shaft penetrates through the case in an axial direction and is arranged to be rotatable around an axis defining the axial direction. The output body is arranged in the case to be rotatable around the axis. The speed reducer mechanism is housed in the case and reduces a rotational speed of the motor and transmits rotational force with the rotational speed thus reduced to the output body. The speed reducer mechanism includes only one pair of gears meshing with each other.

To overcome the problem described above, an electric bicycle according to another implementation includes the motor unit described above.

BRIEF DESCRIPTION OF DRAWINGS

FIG. 9 is a side view of a motor unit of the electric bicycle;

DESCRIPTION OF EMBODIMENTS

The present disclosure generally relates to a motor unit and a two-wheeler, and more particularly relates to a motor unit including a case, a motor, an output body, and a speed reducer mechanism and an electric bicycle (such as an electric assist bicycle or an e-bike) including such a motor unit.

A first embodiment of a motor unit and electric bicycle according to the present disclosure will be described with reference to FIGS. 1-4.

Figure 1:
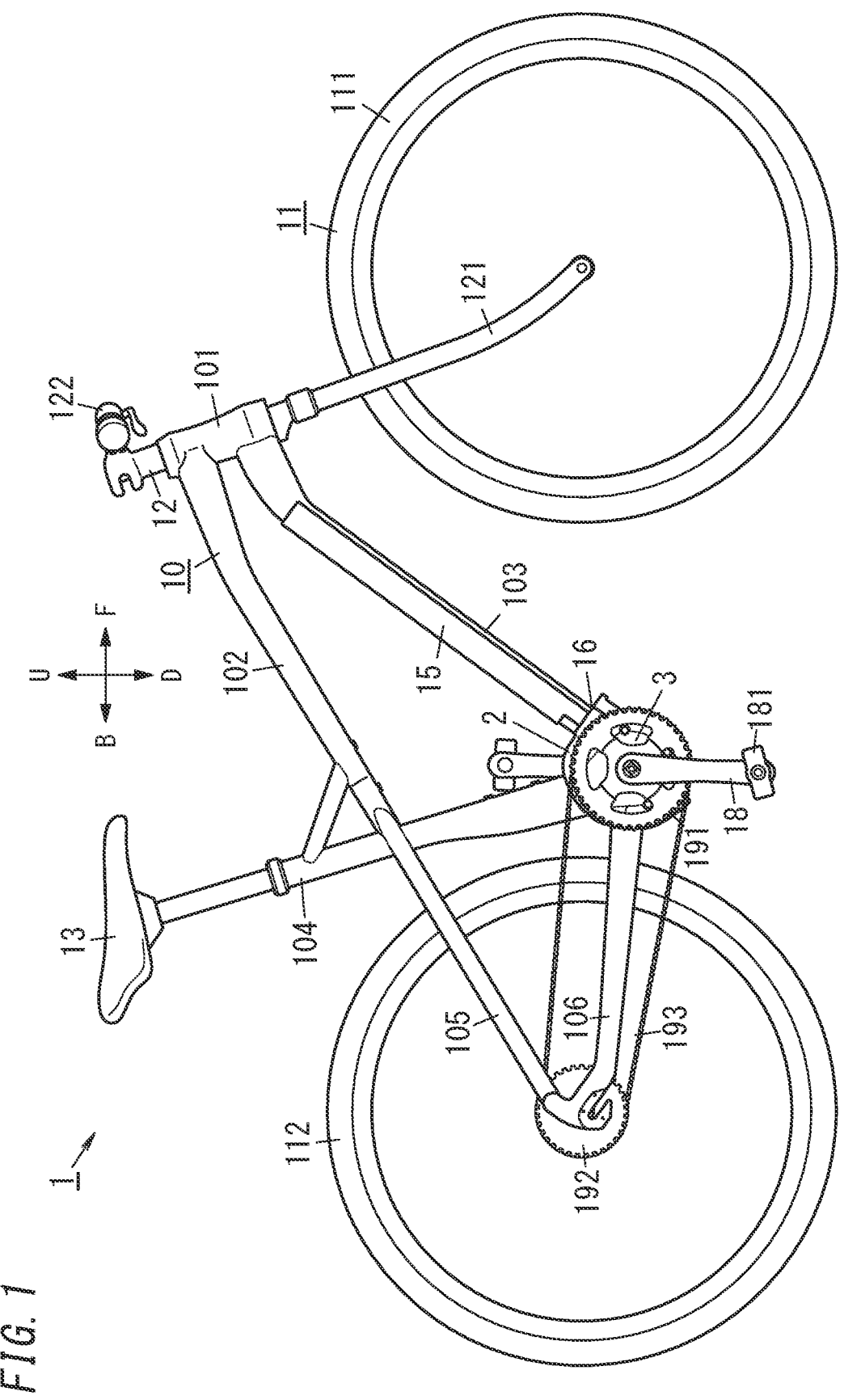
FIG. 1 is a side view of an electric bicycle according to a first embodiment.
Figure 2:
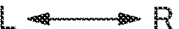
FIG. 2 is a cross-sectional view of the electric bicycle as taken along a plane that passes through an output body of a motor unit thereof, a rotary shaft of its motor, and an axis of a transmission rotary shaft of a speed reducer mechanism thereof.

As shown in FIG. 1, the electric bicycle 1 includes a frame 10, wheels 11, and a motor unit 3. Note that the traveling direction of the electric bicycle 1 is determined by its design. In the following description, the traveling direction is supposed to be a forward direction and the opposite direction thereof is supposed to be a backward direction. The vertical direction is supposed to be a downward direction and the opposite disclosure thereof is supposed to be an upward direction. In addition, a rightward direction and a leftward direction are supposed to be defined in a state where the electric bicycle 1 faces forward as shown in FIG. 2.

As shown in FIG. 1, the frame 10 supports a person (hereinafter referred to as a "rider") who rides the electric bicycle 1. The loads of the frame 10 and the rider are supported by the ground via a front wheel 111 and a rear wheel 112 that form the wheels 11.

The frame 10 includes a head tube 101, a top tube 102, a down tube 103, a seat tube 104, seat stays 105, chain stays 106, and a bracket 2. The frame 10 is made of a metal such as aluminum or stainless steel, which may contain a non-metallic material as well. Alternatively, the entire frame 10 may also be made of a non-metallic material. Thus, the frame 10 may be made of any material without limitation.

The head tube 101 is a cylindrical member, of which the opening extends generally in the upward/downward direction. As used herein, the phrase "generally in the upward/downward direction" refers to a direction which defines an angle of approximately 30 degrees or less with respect to the vertical direction. A handlebar stem 12 is inserted into the head tube 101 to penetrate through the head tube 101 in the upward/downward direction. The handlebar stem 12 is inserted into the head tube 101 so as to be rotatable around an axial direction. At the bottom of the handlebar stem 12, provided is a fork 121, on which the front wheel 111 is mounted rotatably. To the top of the handlebar stem 12, fixed are handlebars 122. The handlebars 122 are provided with an at-hand operating unit for use to, for example, turn a power switch ON or OFF and a derailleur operating unit for changing the speed of the electric bicycle 1 by using a derailleur (transmission) provided for the rear wheel 112.

The top tube 102 is a cylindrical member which extends generally backward from the head tube 101. The top tube 102 does not have to be a straight member. As used herein, the phrase "generally backward" refers to a direction which defines an angle of approximately 40 degrees or less with respect to the backward direction. A frontend portion of the top tube 102 is fixed by welding, for example, to a rear sidewall of the head tube 101. A rear end portion of the top tube 102 is fixed onto the seat tube 104.

The seat tube 104 is a cylindrical member, of which the opening extends generally in the upward/downward direction. To a front sidewall near an upper end portion of the seat tube 104, the rear end portion of the top tube 102 is fixed by welding, for example. Into the opening at the upper end portion of the seat tube 104, inserted is a seat post extending downward from a saddle 13. Fixing the seat post into the seat tube 104 allows the saddle 13 to be fixed with respect to the seat tube 104. The bracket 2 is fixed to a lower end portion of the seat tube 104.

The down tube 103 is a cylindrical member which extends generally diagonally downward and backward from the head tube 101. The top tube 102 does not have to be a straight member. As used herein, the phrase "generally diagonally downward and backward" refers to a direction which points obliquely downward with respect to both the backward direction and the direction in which the head tube 101 extends. A frontend portion of the down tube 103 is fixed by welding, for example, to a rear sidewall of the head tube 101 such that the down tube 103 is fixed below a point where the top tube 102 is fixed. The bracket 2 is fixed onto a rear end portion of the down tube 103. The bracket 2 forms part of the frame 10 and supports the motor unit 3.

In a lower part of the bracket 2, fixed is the motor unit 3. The motor unit 3 is supported by the bracket 2. A cabling space is formed between the inner surface of the bracket 2 and the outer surface of the motor unit 3.

To a frontend portion of the bracket 2, a rear end portion of the down tube 103 is fixed by fitting (which may also be shrink fitting), binding, or welding, for example. To a middle portion of the bracket 2 in the forward/backward direction, a lower end portion of the seat tube 104 is fixed by fitting (which may also be shrink fitting), binding, or welding, for example. To a rear end portion of the bracket 2, respective frontend portions of the chain stays 106 are fixed by fitting (which may also be shrink fitting), binding, or welding, for example. The chain stays 106 are two hollow or solid members which extend generally backward from the bracket 2. In the first embodiment, to the rear end portion of the bracket 2, respective frontend portions of the chain stays 106, each having a cylindrical shape, are fixed by welding.

To a rear end portion of the top tube 102, respective frontend portions of the seat stays 105 are fixed by fitting (which may also be shrink fitting), binding, or welding, for example. The seat stays 105 are two hollow or solid members which extend generally backward from around the upper end portion of the seat tube 104. In the first embodiment, respective frontend portions of the seat stays 105, each having a cylindrical shape, are fixed by welding, for example. The respective rear end portions of the seat stays 105 are fixed to their associated rear end portions of the chain stays 106. The rear wheel 112 is mounted rotatably on their coupling portions.

Furthermore, the bracket 2 and the down tube 103 include a battery attachment 16, to which a battery 15 for use to supply power to the motor unit 3 is attached. In addition, the battery attachment 16 further includes a plurality of terminals to be respectively electrically connected to a plurality of power feeding or signal-transmitting battery terminals provided at the lower end portion of the battery 15. To each of the plurality of terminals, one end of a cable is electrically connected.

Meanwhile, through the down tube 103 and the cabling space, a shift cable that connects a derailleur operating unit to a derailleur mechanism and a brake cable are passed.

Figure 3:
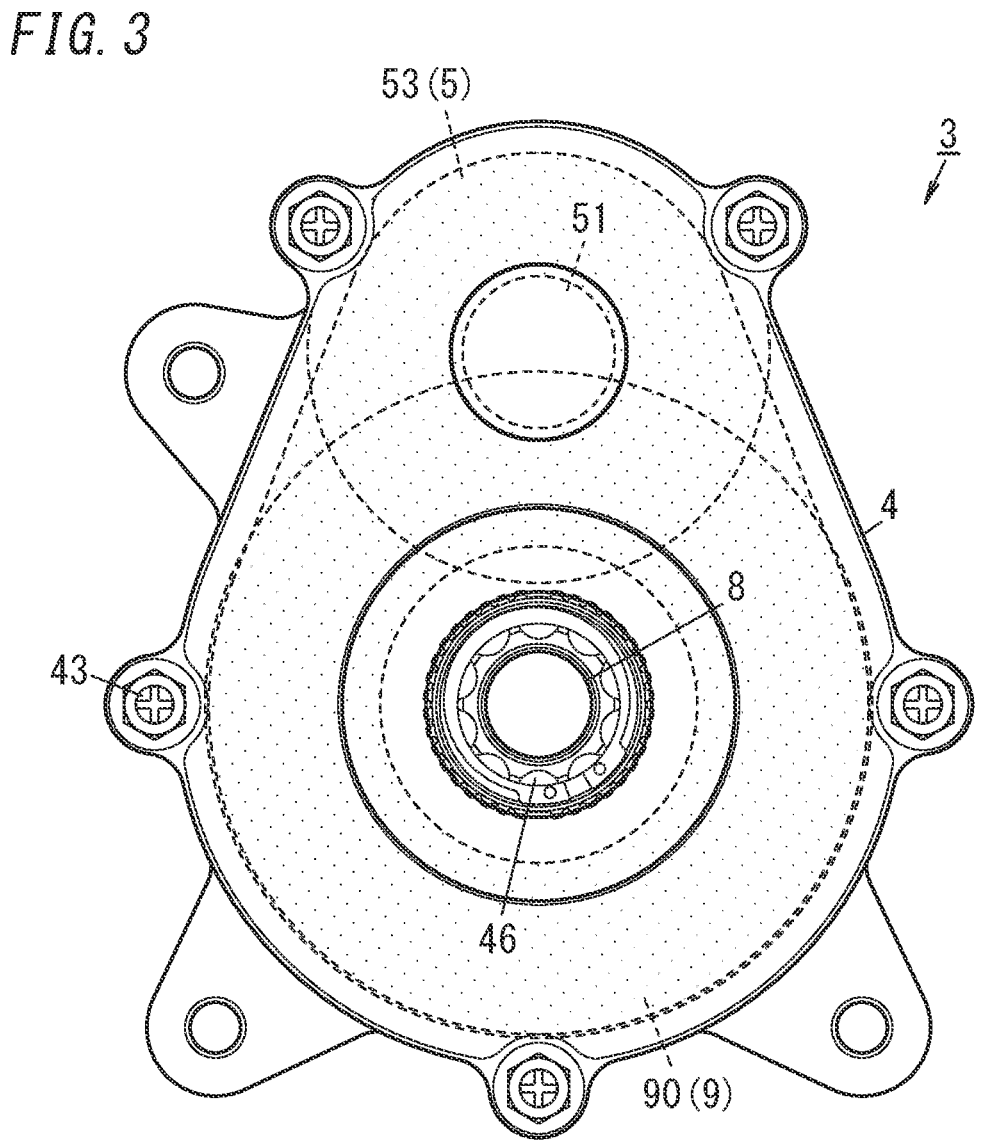
FIG. 3 is a side view of the motor unit.

Next, the motor unit 3 will be described with reference to FIGS. 2 and 3. The motor unit 3 includes a case 4, a motor 5, an input shaft 6, an input body 7, an output body 8, and a speed reducer mechanism 9.

The case 4 forms the shell of the motor unit 3. The case 4 houses, in its internal housing space, various pieces of equipment including the speed reducer mechanism 9. The case 4 is typically made of a metallic material such as aluminum, stainless steel, or a magnesium alloy but may also be made of a non-metallic material. That is to say, the case 4 may be made of any material without limitation.

The case 4 includes a first divided part 41 located on the left and a second divided part 42 located on the right. The case 4 is formed by assembling the first divided part 41 and the second divided part 42 together.

The internal housing space of the second divided part 42 is opened to the left. The first divided part 41 and the second divided part 42 are merged with each other in the rightward/leftward direction such that their respective housing spaces are continuous with each other and are fixed to each other with fastening members 43 such as bolts. The case 4 is formed by fixing the first divided part 41 and the second divided part 42 to each other. Note that the dimensions, shape, thickness, and other parameters of the case 4 are not limited to any particular ones. Also, the housing space formed inside the case 4 may or may not be hermetically sealed.

The motor 5 is attached to the case 4. More specifically, the motor 5 is mostly housed in the first divided part 41. The motor 5 is housed in the case 4. The motor 5 includes a rotary shaft 51, a rotor 52 to rotate integrally with the rotary shaft 51, and a stator 53. The motor 5 is an inner rotor motor, of which the stator 53 is located radially outside the rotary shaft 51. Alternatively, an axial gap motor may also be adopted as the motor 5. The rotary shaft 51 is housed rotatably to make its center axis of rotation parallel to the axis 600. The rotary shaft 51 protrudes toward one side from the stator 53. The outer surface of the protruding portion of the rotary shaft 51 has a teeth part 54 meshing with the speed reducer mechanism 9. The protruding portion of the rotary shaft 51 and the teeth part 54 formed on its outer surface form a gear that turns integrally with the rotary shaft 51. Both end portions of the rotary shaft 51 are supported respectively by a rotary shaft supporting bearing 551 disposed in the first divided part 41 and a rotary shaft supporting bearing 552 disposed in the second divided part 42. Note that the rotary shaft 51 is provided with a waved washer 553 located between the rotary shaft supporting bearing 552 and the second divided part 42. Providing the waved washer 553 may prevent the rotary shaft 51 from backlashing and may also increase the degree of quietness of the motor unit 3.

The stator 53 is preferably formed to have a diameter 531 equal to or less than 80 mm. This makes it easier to contribute to downsizing the motor 5 and the motor unit 3. More preferably, the stator 53 is formed to have a diameter 531 equal to or less than 70 mm. This makes it even easier to contribute to downsizing the motor 5 and the motor unit 3. Furthermore, it is preferable that the stator 53 be formed to have a diameter 531 equal to or greater than the outside diameter (diameter) of the rotary shaft 51. This would stabilize the torque applied by the rotary shaft 51 of the motor 5. The rotary shaft 51 may have an outside diameter of 8 mm, for example.

The input shaft 6 is arranged to penetrate through the case 4 in the axial direction 600 (e.g., in the rightward/leftward direction in the first embodiment) and be rotatable around an axis 600 defining the axial direction 600 of the input shaft 6. The input shaft 6 includes an input shaft body 60 and the input body 7. In the first embodiment, the input shaft body 60 is configured as a solid member. However, this is only an example of the present disclosure and should not be construed as limiting. Alternatively, the input shaft body 60 may also be configured as a hollow member.

The case 4 includes a first bearing 45 to rotatably support the input shaft body 60. The first bearing 45 is provided at one end in the axial direction 600 (i.e., provided at the left end in the first embodiment). The first divided part 41 has an input shaft hole 411 to allow the input shaft body 60 to pass therethrough. The first bearing 45 is disposed at the input shaft hole 411. In the first embodiment, the first bearing 45 is configured as a ball bearing. Note that the first bearing 45 does not have to be a ball bearing but may also be configured as a roller bearing or any of various other types of bearings.

In addition, the case 4 also includes a second bearing 46 to rotatably support the output body 8. The second bearing 46 is provided at the other end in the axial direction 600 (i.e., provided at the right end in the first embodiment). The second divided part 42 has an input shaft hole 421 to allow the input shaft body 60 to pass therethrough. The second bearing 46 is disposed at the input shaft hole 421. In the first embodiment, the input shaft body 60 is indirectly supported by the second bearing 46 via the output body 8. In the first embodiment, the second bearing 46 is configured as a ball bearing. Note that the second bearing 46 does not have to be a ball bearing but may also be configured as a roller bearing or any of various other types of bearings.

As shown in FIG. 1, one end portion of each crank arm 18 is fixed to an associated end portion of the input shaft body 60. To the other end portion of the crank arm 18, attached rotatably is a pedal 181. The rider of the electric bicycle 1 may apply manual rotational force to the input shaft body 60 by pumping the pedals 181.

As shown in FIG. 2, the input body 7 is disposed along the outer peripheral surface of the input shaft body 60 and rotates integrally with the input shaft body 60. The input body 7 is a cylindrical member, its axial direction 600 is aligned with the rightward/leftward direction, and is arranged concentrically with the input shaft body 60. The length of the input body 7 as measured in the rightward/leftward direction is shorter than the length of the input shaft body 60 as measured in the rightward/leftward direction. The input body 7 and the input shaft body 60 include fitting portions 71, 61, which are fitted into each other to prevent the input body 7 and the input shaft body 60 from rotating relative to each other around the axis 600. The fitting portions 71, 61 are provided in a range in the axial direction 600. In the first embodiment, a left end portion of the input body 7 and a corresponding portion of the input shaft body 60 are provided with the fitting portions 71, 61, which are configured as splines or serrations, for example. Alternatively, the fitting portions 71, 61 may also be configured as male and female threads to be fitted into each other.

Furthermore, in the first embodiment, the input body 7 is coupled to the input shaft body 60. A gap 70 is left between the input body 7 and the input shaft body 60. This makes it easier to insert the input shaft body 60 into the input body 7 having the cylindrical shape.

The output body 8 is arranged along the outer peripheral surface of the input shaft body 60 to be rotatable around the axis 600 and penetrates through the case in the axial direction 600. The output body 8 receives the rotational force from the input body 7. The input body 7 and the output body 8 include coupling portions that couple the input body 7 and the output body 8 to each other to allow the input body 7 and the output body 8 to rotate integrally with each other. On the outer peripheral surface of the input body 7, provided is a fitting portion 72, which is configured as splines that are uneven portions arranged side by side in the circumferential direction. In the same way, on the inner peripheral surface of the output body 8, provided is a fitting portion 81, which is configured as splines that are uneven portions arranged side by side in the circumferential direction to be engaged with the fitting portion 72 as splines. The coupling portions are formed by the fitting portions 72 and 81.

The output body 8 is a generally cylindrical member, its axial direction 600 is aligned with the rightward/leftward direction and is disposed concentrically with the input shaft body 60. The length of the output body 8 as measured in the rightward/leftward direction is shorter than the length of the input shaft body 60 as measured in the rightward/leftward direction. A right end portion of the output body 8 protrudes out of the case 4 through the input shaft hole 421 of the second divided part 42. The output body 8 is supported by the second bearing 46 disposed in the second divided part 42. The output body 8, the input shaft body 60, and the input body 7 together form a rotary shaft unit 30. The rotary shaft unit 30 is supported by the case 4 via the first bearing 45 and the second bearing 46.

The rotary shaft 51 of the motor 5 is preferably located over the axis 600 and backward of the axis 600 in the traveling direction of the electric bicycle 1. This makes it easier to align the case 4 along the seat tube 104. Alternatively, the rotary shaft 51 of the motor 5 may be located under the axis 600. This enables lowering the center of gravity of the electric bicycle 1 and increasing the stability. In addition, this makes it easier to leave a housing space in the seat tube 104 for a configuration that the battery 15 is built in the seat tube 104 (to be described later).

The pitch 511 between the rotary shaft 51 of the motor 5 and the output body 8 is preferably equal to or less than 60 mm. As used herein, the "pitch 511" refers to the gap distance between an axis defining the center of rotation of the rotary shaft 51 and an axis (i.e., the axis 600) defining the center of rotation of the output body 8. Setting the pitch 511 at 60 mm or less makes it easier to downsize the case 4 (of the motor unit 3). The pitch 511 is more preferably equal to or less than 55 mm. This makes it even easier to downsize the case 4 (of the motor unit 3). The pitch 511 is even more preferably equal to or less than 50 mm. This makes it even easier to downsize the case 4 (of the motor unit 3). The pitch 511 is even more preferably equal to or less than 45 mm. This makes it even easier to downsize the case 4 (of the motor unit 3). Furthermore, the pitch 511 is preferably equal to or greater than the outside diameter (diameter) of the input shaft 6. This enables setting an appropriate gear reduction ratio for the speed reducer mechanism 9.

A front sprocket 191 is attached to the portion, protruding out of the case 4, of the output body 8. The front sprocket 191 is attached to the output body 8 on either side of the axial direction 600. In the first embodiment, the front sprocket 191 is fixed, using a locking ring 195, to a portion, protruding to the right of the case 4, of the output body 8. The front sprocket 191 rotates integrally with the output body 8. In addition, as shown in FIG. 1, a rear sprocket 192 is fixed to a hub of the rear wheel 112. A chain 193 is hung around between the front sprocket 191 and the rear sprocket 192.

Figure 4:
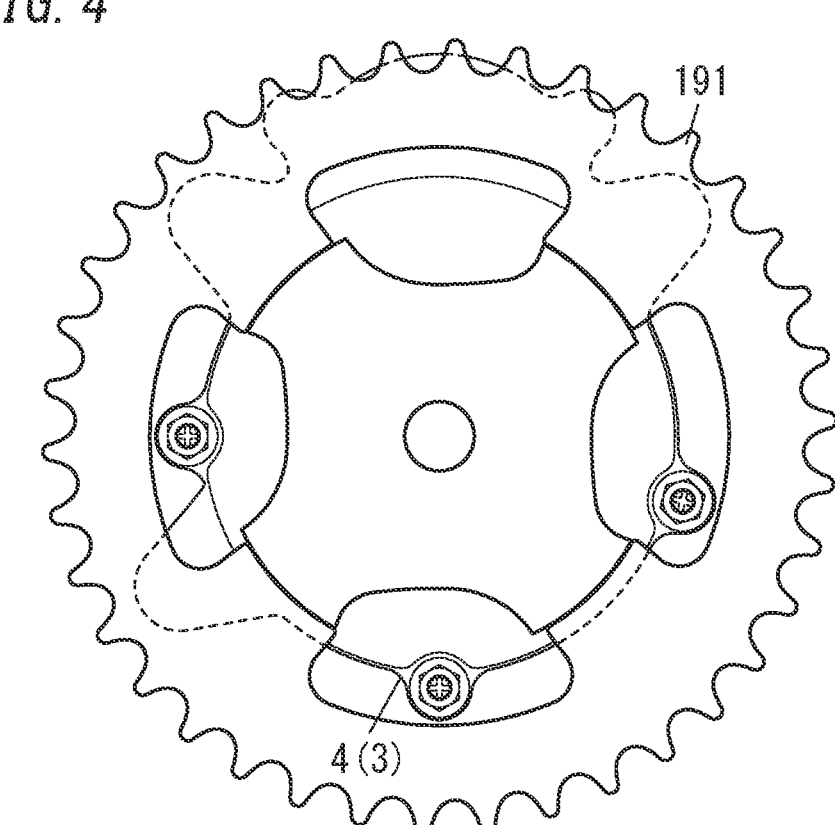
FIG. 4 is a side view of a sprocket and the motor unit of the electric bicycle.

As shown in FIG. 4, when viewed in the axial direction 600, the outline of the case 4 falls within the outline of the sprocket 191. This not only improves the appearance of the electric bicycle 1 but also increases the freedom of design of the electric bicycle 1.

Providing the coupling portions as the fitting portions 72 and 81 for the input body 7 (input shaft 6) and the output body 8 as shown in FIG. 2 allows the input shaft 6 and the output body 8 to rotate integrally with each other, thus making the number of revolutions of the input shaft 6 equal to the number of revolutions of the output body 8. This allows the phase in the rotation of the input shaft 6 (including the input shaft body 60 and the input body 7), the output body 8, and the front sprocket 191 around the axis 600 to be fixed.

Also, when a so-called "coaster brake" is adopted, such coupling portions work effectively. The coaster brake is designed to put on the brakes within the hub of the rear wheel 112 via the chain 193 with the rotational force produced when the front sprocket 191 turns in an anti-acceleration direction. The configuration described above allows the input shaft 6 and the output body 8 to rotate integrally with each other, thus allowing the coaster brake to work smoothly. Note that the fitting portions 72 and 81 as the coupling portions do not have to be splines but may also be serrations. For example, a key groove may be formed on the outer surface of the input body 7 and the output body 8 and a key may be fitted into the key groove.

A gear 90 forming part of the speed reducer mechanism 9 is attached to the output body 8. The gear 90 has a teeth part 91 on the outer peripheral surface thereof. The gear 90, forming part of the output body 8, turns integrally with the output body 8, receive rotational force from the motor 5, and transmits the rotational force to the output body 8. In the first embodiment, a one-way clutch 32 is provided between the speed reducer mechanism 9 and the output body 8. Specifically, the gear 90 is coupled to the output body 8 via the one-way clutch 32. The one-way clutch 32 is disposed on the outer periphery of the output body 8. The center axis of rotation of the one-way clutch 32 is located on the axis 600. This eliminates the need to dispose the one-way clutch 32 distant from the input shaft 6 and the output body 8 in the case 4, thus making it easier to leave a space distant from the input shaft 6 and the output body 8 inside the case 4.

The one-way clutch 32 is configured to, when rotational force is applied in a direction in which the electric bicycle 1 is accelerated in the traveling direction (hereinafter referred to as an "accelerating direction") from the motor 5 to the gear 90, transmit the rotational force to the output body 8 and is also configured to, when rotational force is applied in a direction opposite from the accelerating direction to the gear 90, not transmit the rotational force to the output body 8. Also, when the rotational force is applied in the accelerating direction to the output body 8, the one-way clutch 32 does not transmit the rotational force to the gear 90.

The speed reducer mechanism 9 is housed in the case 4 and reduces the rotational speed of the motor 5 and transmits rotational force with the rotational speed thus reduced to the output body 8. The speed reducer mechanism 9 includes only one pair of gears that mesh with each other. Specifically, the speed reducer mechanism 9 includes a drive gear that turns integrally with the rotary shaft 51 of the motor 5 (i.e., a part that protrudes from the rotary shaft 51 and that includes the teeth part 54) and a driven gear 90 that turns integrally with the output body 8. The speed reducer mechanism 9 reduces the rotational speed of the motor 5 by so-called "single reduction" and transmits rotational force with the rotational speed thus reduced to the output body 8.

The number of teeth of the drive gear (i.e., the number of teeth of the teeth part 54) is preferably equal to or less than nine. This increases the gear reduction ratio defined by meshing between the drive gear and the driven gear 90, makes it easier to achieve a desired gear reduction ratio even by single reduction, and contributes more effectively to downsizing the speed reducer mechanism 9 and the motor unit 3. Also, the number of teeth of the drive gear is preferably equal to or less than five. This further increases the gear reduction ratio defined by meshing between the drive gear and the driven gear 90, makes it easier to achieve a desired gear reduction ratio even by single reduction, and contributes even more effectively to downsizing the speed reducer mechanism 9 and the motor unit 3. Furthermore, the number of teeth of the drive gear is more preferably equal to or less than four. This further increases the gear reduction ratio defined by meshing between the drive gear and the driven gear 90, makes it easier to achieve a desired gear reduction ratio even by single reduction, and contributes even more effectively to downsizing the speed reducer mechanism 9 and the motor unit 3.

Furthermore, the surface of the drive gear (i.e., the surface of the teeth part 54) is preferably subjected to shot peening, air blasting, or plating or has a coating.

Examples of the shot peening include hard shot peening, semi-hard shot peening, WPC treatment, molybdenum disulfide shot peening, and Sirius working. Subjecting the surface of the drive gear to the shot peening decreases the surface roughness of the drive gear and thereby increases the surface slipperiness of the drive gear. This achieves the advantage of reducing the frictional resistance between the drive gear and the driven gear 90 and thereby reducing the noise when the motor unit 3 is driven and the advantage of reducing the abrasion of the driven gear 90. In addition, this also achieves the advantage of increasing the abrasion resistance of the drive gear and decreasing the heat generated in the respective meshing portions between the drive gear and the driven gear 90.

Examples of the air blasting include air blasting using a #100 medium and air blasting using a #400 medium. Subjecting the surface of the drive gear to the air blasting decreases the surface roughness of the drive gear and thereby increases the surface slipperiness of the drive gear. This achieves the advantage of reducing the frictional resistance between the drive gear and the driven gear 90 and thereby reducing the noise when the motor unit 3 is driven and the advantage of reducing the abrasion of the driven gear 90.

Examples of the coating include diamond-like carbon (DLC) coating, Teflon® coating, drilube treatment, alumite treatment, hard alumite treatment, molybdenum disulfide coating, and various types of plating. Examples of the various types of plating include hard chromium plating, electrolytic hard chromium carbide plating, trivalent chromate plating, nickel plating, electroless nickel plating, fluorine-compound electroless nickel plating, and fluorine-compound electroless nickel plating in combination with parker treatment.

Subjecting the surface of the drive gear to any of these types of coating decreases the surface roughness of the drive gear and thereby increases the surface slipperiness of the drive gear. This achieves the advantage of reducing the frictional resistance between the drive gear and the driven gear 90 and thereby reducing the noise when the motor unit 3 is driven and the advantage of reducing the abrasion of the driven gear 90. In addition, the drive gear is preferably polished. Polishing the surface of the drive gear decreases the surface roughness of the gear and thereby increases the surface slipperiness of the drive gear. This achieves the advantage of reducing the frictional resistance between the drive gear and the driven gear 90 and thereby reducing the noise when the motor unit is driven and the advantage of reducing the abrasion of the driven gear 90.

At least part of the driven gear 90 is preferably made of a resin. As used herein, the expression "at least part is made of a resin" refers to a situation where at least the teeth of the gear 90 are made of a resin. The driven gear 90 is a gear made of a resin and molded into a cylindrical shape. Specifically, the resin may be polyacetal, for example. However, this is only an example and should not be construed as limiting. Alternatively, any other suitable resin such as nylon may also be used.

Polyacetal is a material having a self-lubricating property. Molding the driven gear 90 out of polyacetal enables achieving the advantage of reducing the abrasion of the driven gear 90, reducing the noise when the motor unit 3 is driven, and increasing the durability of the motor unit 3.

Also, generally speaking, a driven gear included in a speed reducer mechanism tends to have a relatively large diameter, and therefore, have a relatively heavy weight. In contrast, according to the first embodiment, the driven gear 90 is molded of a resin such as polyacetal, thus lessening the weight of the speed reducer mechanism 9 and thereby reducing the overall weight of the electric bicycle 1. In addition, lessening the weight of the driven gear 90 decreases the rotational moment of the driven gear 90, thus allowing the motor 5 to propel the electric bicycle 1 more swiftly.

Compared to making the driven gear 90 of nylon, using polyacetal as a material for the driven gear 90 enables achieving the advantages of realizing a higher degree of durability and providing the motor unit 3 at a lower price. Note that polyacetal has low heat resistance and comes to have decreased durability at an elevated temperature. However, since the speed reducer mechanism 9 is a single-reduction mechanism, the driven gear 90 turns more slowly than in a double-reduction mechanism, thus reducing the chances of raising the temperature so much as to cause a decline in durability.

Polyacetal is classifiable, according to its molecular structure, into the two types, namely, a homo polymer and a copolymer. The material for the driven gear 90 may be a homo polymer or a copolymer, whichever is appropriate.

The driven gear 90 is preferably formed to have a diameter 901 equal to or less than 110 mm. This makes it easier to downsize the speed reducer mechanism 9 and the motor unit 3. The gear 90 is more preferably formed to have a diameter 901 equal to or less than 95 mm. This makes it even easier to downsize the speed reducer mechanism 9 and the motor unit 3. The gear 90 is even more preferably formed to have a diameter 901 equal to or less than 80 mm. This makes it even easier to downsize the speed reducer mechanism 9 and the motor unit 3. Also, the gear 90 is preferably formed to have a diameter 901 equal to or greater than the diameter of the rotary shaft 51. This makes it easier to ensure sufficient rigidity for the gear 90 to prevent the gear 90 from falling down and may also increase the degree of quietness and durability of the gear. In addition, decreasing the outside diameter of the gear 90 may also reduce the chances of a helical gear falling down due to the load in a thrusting direction (i.e., the axial direction 600), thus also increasing the degree of quietness and durability of the speed reducer mechanism 9.

Also, the drive gear and the driven gear 90 are preferably helical gears. This increases, compared to a situation where the drive gear and the driven gear 90 are spur gears, not only the durability but also the contact ratio and the degree of quietness.

As the rider pumps the pedals 181 of the electric bicycle 1, rotational force is applied to the input shaft body 60 in the accelerating direction. As the input shaft body 60 rotates, the input body 7 also rotates integrally with the input shaft body 60. The rotational force applied to the input body 7 in the accelerating direction turns into rotational force applied to the output body 8 in the accelerating direction, thus rotating the output body 8 and the front sprocket 191 in the accelerating direction. As the front sprocket 191 rotates in the accelerating direction, its rotational force is transmitted via the chain 193 to the rear sprocket 192 in the accelerating direction, thus causing the rear sprocket 192 and the rear wheel 112 to turn in the accelerating direction. This propels the electric bicycle 1 in the traveling direction.

Optionally, while the electric bicycle 1 is propelled by human driving force in the traveling direction, the rotational force applied from the motor 5 may be applied as auxiliary driving force to the output body 8. This option will be described in detail below. As the rotary shaft 51 of the motor 5 rotates in the accelerating direction, the gear 90 meshing with the gear (teeth part 54) that turns integrally with the rotary shaft 51 of the motor 5 turns in the accelerating direction. The rotational force of the gear 90 in the accelerating direction is transmitted via the one-way clutch 32 to the output body 8. That is to say, the output body 8 serves as a resultant force body in which the human driving force applied from the input body 7 and the rotational force applied from the motor 5 are combined with each other. The motor unit 3 according to the first embodiment is a so-called "uniaxial motor unit 3."

In the electric bicycle 1, the rotational force applied from the motor 5 is controlled according to the torque applied to the input shaft body 60 and the number of revolutions of the input shaft body 60 per unit time. The torque applied to the input shaft body 60 is detected by a torque detection unit 33. The torque detection unit 33 is arranged along the surface of the input shaft 6 to detect the torque applied to the input shaft 6.

In the first embodiment, a magnetostriction generation unit 331 to which magnetic anisotropy is applied is provided on the outer peripheral surface of the input body 7. In addition, a coil 332 is arranged to be spaced by a certain distance from the region, where the magnetostriction generation unit 331 is provided, on the outer peripheral surface of the input body 7. The magnetostriction generation unit 331 and the coil 332 together form a magnetostrictive torque sensor serving as the torque detection unit 33. Any of various types of sensors may be used as appropriate as such a magnetostrictive torque sensor. The torque detection unit 33 does not have to be a magnetostrictive torque sensor, either.

The number of revolutions of the input shaft body 60 per unit time is detected by an input shaft rotation detection unit 34. The input shaft rotation detection unit 34 includes a target 344 to be detected attached to the rotary shaft unit 30 and a detection unit 345 fixed to a region other than the rotary shaft unit 30.

In the first embodiment, a rotator 341 is attached to the outer peripheral surface of the input shaft body 60. The rotator 341 is attached by having the outer peripheral surface of the input shaft body 60 press fitted into an inner peripheral surface of the rotator 341. The rotator 341 rotates integrally with the input shaft body 60. The rotator 341 has a teeth part at the tip of its portion extending along the radius of the input shaft 6. Another rotator 342, having a teeth part that meshes with the teeth part of the rotator 341, is attached rotatably onto the trajectory of rotation of the teeth part of the rotator 341. Still another rotator 343, having a teeth part that meshes with the teeth part of the rotator 342, is attached rotatably onto the trajectory of rotation of the teeth part of the rotator 342. The rotator 343 is extended along the axis 600 of the input shaft 6 and includes, at the tip thereof, magnets which are arranged as the targets 344 to be detected at regular intervals along the circumference. The rotators 341-343 are provided to make the input shaft rotation detection unit 34 detect the number of revolutions of the input shaft 6.

Furthermore, a Hall IC for detecting the magnetic force of the magnets is provided as the detection unit 345 at a position corresponding to the trajectory of rotation of the magnets as the targets 344 to be detected. The detection unit 345 is mounted on a control board 35 (to be described later). Mounting the detection unit 345 directly onto the control board 35 eliminates the need to provide any connectors or cables for connecting the detection unit 345 to the control board 35, thus making it easier to downsize the motor unit 3.

As the input shaft rotation detection unit 34 including the magnets and the Hall IC, any of various known detection units may be used as appropriate. Also, the input shaft rotation detection unit 34 does not have to include the magnets and the Hall IC.

The rotator 341 is provided, in the axial direction 600, opposite from the sprocket 191 with respect to the torque detection unit 33. Referring to FIG. 2, with respect to the torque detection unit 33, the sprocket 191 is located on the right, while the rotator 341 is located on the left. This allows the rotator 341 to be disposed distant from the sprocket 191, thus increasing the freedom of design.

The motor unit 3 further includes a motor rotation detection unit 36 for detecting the number of revolutions of the rotor 52. The motor rotation detection unit 36 includes a detection unit 361. A Hall IC for detecting the magnetic force of the rotor 52 is provided as the detection unit 361 at a position corresponding to the trajectory of rotation of the rotor 52 of the motor 5. Note that the magnetic force to be detected by the Hall IC may be the magnetic force of the rotor 52 itself or the magnetic force of a member that rotates along with the rotor 52, whichever is appropriate. The detection unit 361 is mounted on the control board 35. Mounting the detection unit 361 directly onto the control board 35 eliminates the need to provide any connectors or cables for connecting the detection unit 361 to the control board 35, thus making it easier to downsize the motor unit 3.

As such a motor rotation detection unit 36 including the magnets and the Hall IC, any of various known detection units may be used as appropriate. Also, the motor rotation detection unit 36 does not have to include the magnets and the Hall IC. Alternatively, a sensor other than the Hall IC may also be used as the detection unit 361. For example, a resolver or an optical sensor may be used as the detection unit 361.

The motor unit 3 includes, inside the case 4, a control board 35 including a control unit for controlling the motor 5. The control unit may include, for example, a microcomputer and execute a program stored in a storage device such as a read-only memory (ROM) to control the operations of respective elements. Any of various types of control units may be used as appropriate as such a control unit and detailed description thereof will be omitted herein. The control unit controls the rotational force applied from the motor 5 based on the torque detected by the torque detection unit 33 and the number of revolutions detected by the input shaft rotation detection unit 34.

In the electric bicycle 1 according to the first embodiment, the speed reducer mechanism 9 includes only one pair of gears that mesh with each other. This reduces the chances of causing a decline in the power transmission efficiency of the speed reducer mechanism 9 and makes it easier to increase the degree of quietness and downsize the case 4 (of the motor unit 3) and the electric bicycle 1. In particular, reducing the size of the case 4 enables shortening a so-called "rear-center distance" from the center of the rear wheel 112 to the axis 600 of the input shaft body 60, thus making it easier for the user to handle the electric bicycle 1.

Figure 5:
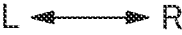
FIG. 5 is a cross-sectional view taken along a plane that passes through an output body of a motor unit according to a second embodiment, a rotary shaft of its motor, and an axis of a transmission rotary shaft of a speed reducer mechanism thereof.

Next, a motor unit 3 according to a second embodiment will be described with reference to FIG. 5. The motor unit 3 according to the second embodiment is mostly the same as the motor unit 3 according to the first embodiment. Thus, description of their common features will be omitted herein and the following description will be focused on their differences.

In the first embodiment described above, the rotary shaft supporting bearing 551 for supporting the rotary shaft 51 is provided on the left of the first bearing 45 for supporting the input shaft body 60 (i.e., located opposite from the front sprocket 191) as shown in FIG. 2. On the other hand, in the second embodiment, the rotary shaft supporting bearing 551 is provided to overlap with the first bearing 45 in the axial direction 600. This makes the left side surface of the case 4 flattened and simpler.

Figure 6:
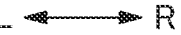
FIG. 6 is a cross-sectional view taken along a plane that passes through an output body of a motor unit according to a third embodiment, a rotary shaft of its motor, and an axis of a transmission rotary shaft of a speed reducer mechanism thereof.

Next, a motor unit 3 according to a third embodiment will be described with reference to FIG. 6. The motor unit 3 according to the third embodiment is mostly the same as the motor unit 3 according to the first embodiment. Thus, description of their common features will be omitted herein and the following description will be focused on their differences.

In the first embodiment described above, the three rotators 341-343 are provided as rotators for making the input shaft rotation detection unit 34 detect the number of revolutions of the input shaft 6. On the other hand, in the third embodiment, only one rotator 346 is provided as shown in FIG. 6.

In addition, in the first embodiment described above, the rotator 341 attached to the input shaft 6 is located on the left of the torque detection unit 33 as shown in FIG. 2. On the other hand, in the third embodiment, the rotator 346 attached to the input shaft 6 is located on the right of the torque detection unit 33 as shown in FIG. 6.

According to the third embodiment, providing only one rotator 346 makes it easier to downsize the case 4 (of the motor unit 3) and the electric bicycle 1.

Figure 7:
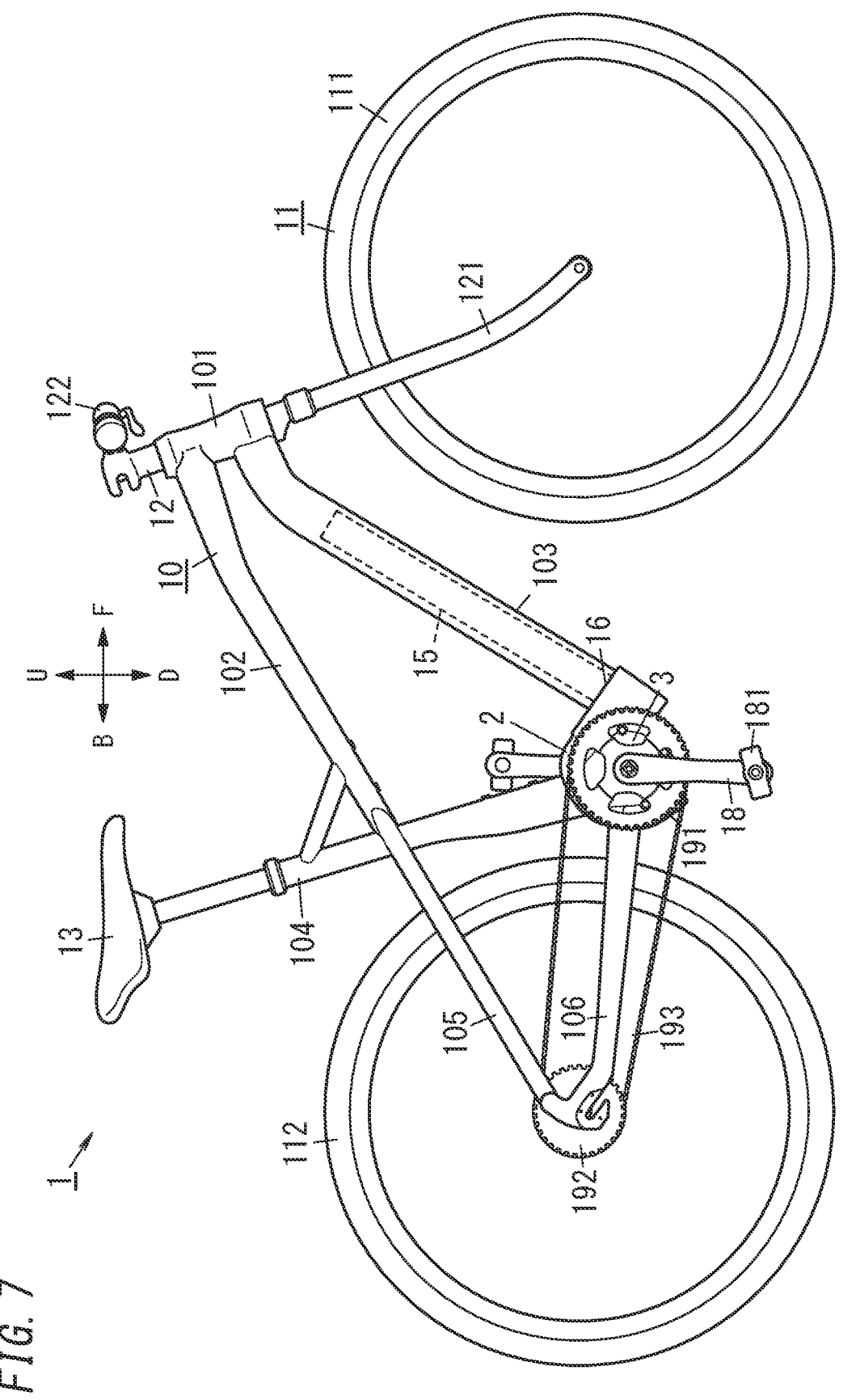
FIG. 7 is a side view of an electric bicycle according to a fourth embodiment.

Next, a motor unit 3 according to a fourth embodiment will be described with reference to FIG. 7. The motor unit 3 according to the fourth embodiment is mostly the same as the motor unit 3 according to the first embodiment. Thus, description of their common features will be omitted herein and the following description will be focused on their differences.

In the first embodiment described above, the battery 15 is exposed to form part of the surface of the down tube 103 as shown in FIG. 2. On the other hand, according to the fourth embodiment, the battery 15 is built in the down tube 103 as shown in FIG. 7, thus contributing to preventing theft of the battery 15.

Figure 8:
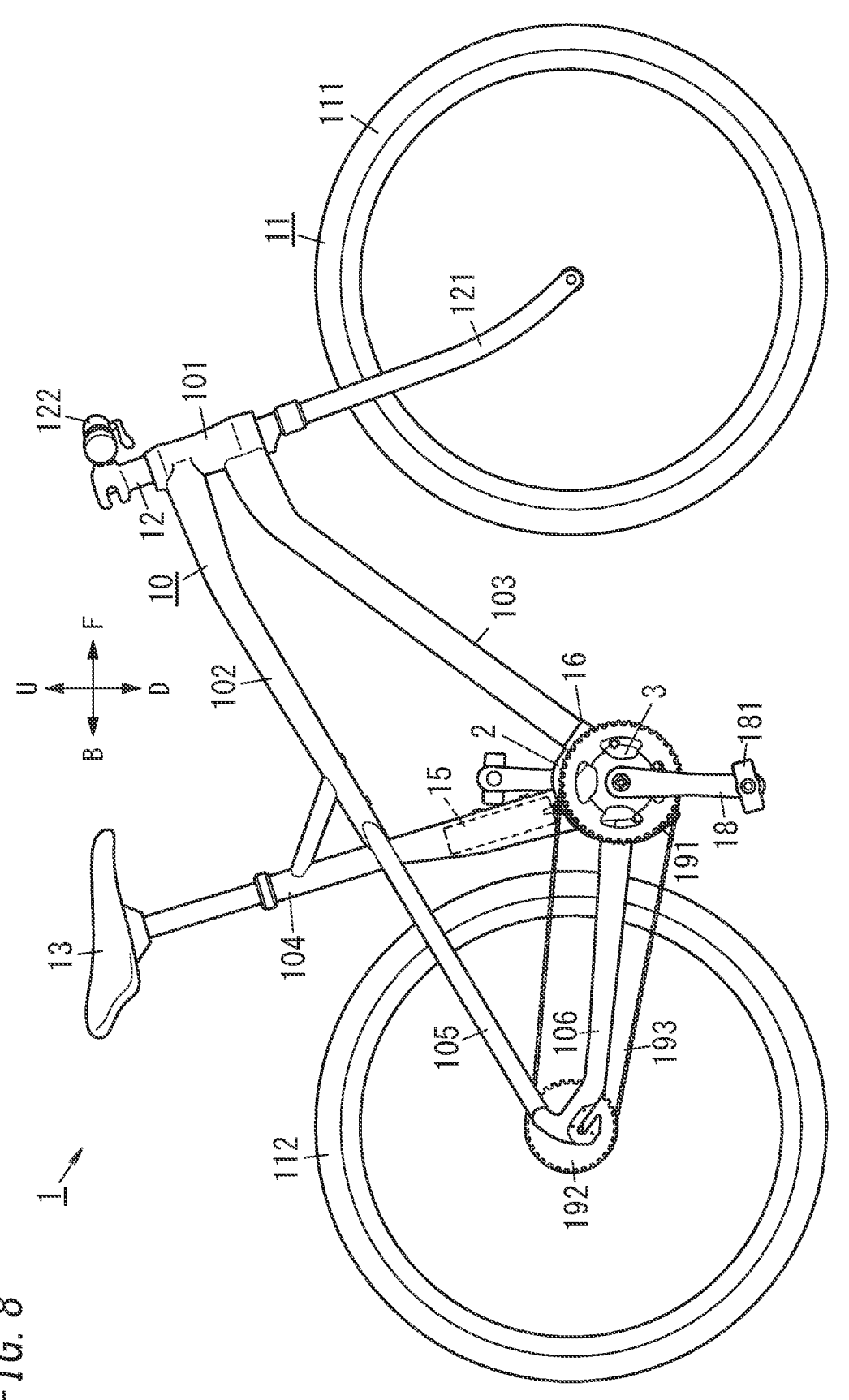
FIG. 8 is a side view of an electric bicycle according to a fifth embodiment.
Figure 9:
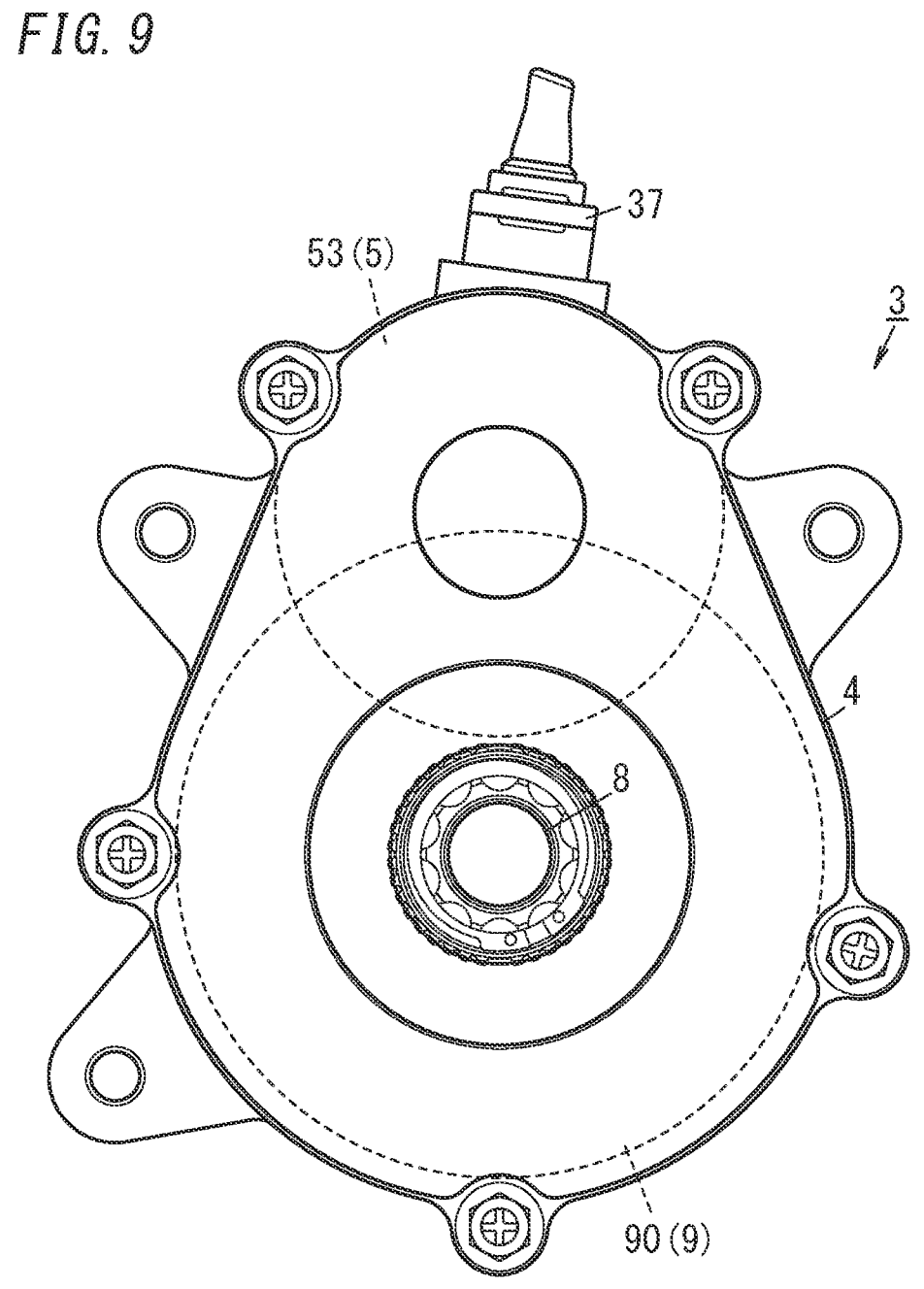

Next, a motor unit 3 according to a fifth embodiment will be described with reference to FIGS. 8 and 9. The motor unit 3 according to the fifth embodiment is mostly the same as the motor unit 3 according to the first embodiment. Thus, description of their common features will be omitted herein and the following description will be focused on their differences.

In the first embodiment described above, the battery 15 is loaded into the down tube 103 as shown in FIG. 2. On the other hand, in the fifth embodiment, the battery 15 is built in the seat tube 104 as shown in FIG. 8. A cable connected to the battery 15 is connected to a connector 37 of the motor unit 3 as shown in FIG. 9. The connector 37 is provided at the upper end portion of the case 4.

According to the fifth embodiment, the battery 15 is built in the seat tube 104, thus increasing the freedom of design of the down tube 103. In addition, the battery 15 is built in the seat tube 104, and therefore, is stealable less easily.

Figure 10:
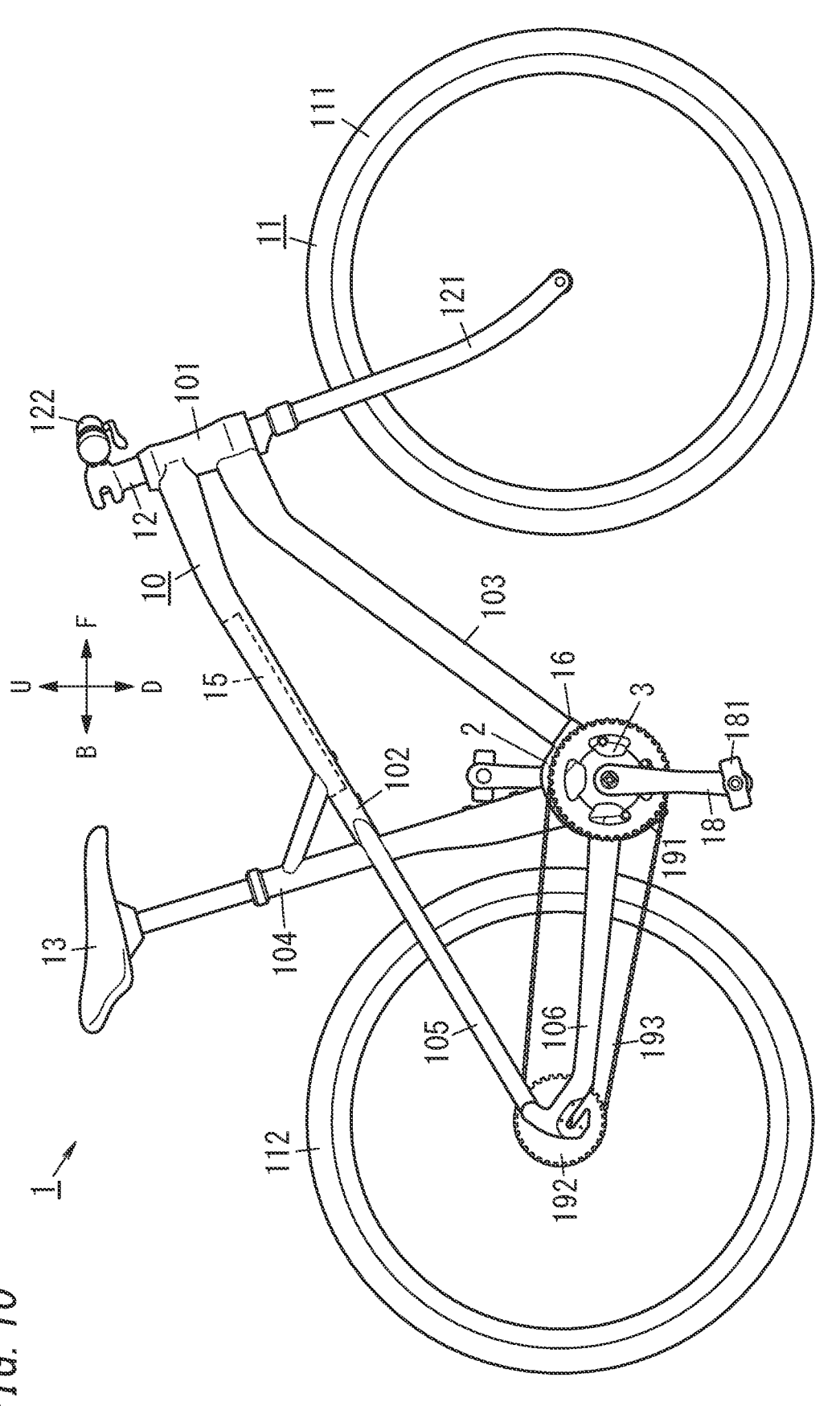
FIG. 10 is a side view of an electric bicycle according to a sixth embodiment.

Next, a motor unit 3 according to a sixth embodiment will be described with reference to FIG. 10. The motor unit 3 according to the sixth embodiment is mostly the same as the motor unit 3 according to the first embodiment. Thus, description of their common features will be omitted herein and the following description will be focused on their differences.

In the first embodiment described above, the battery 15 is loaded into the down tube 103 as shown in FIG. 2. On the other hand, in the sixth embodiment, the battery 15 is built in the top tube 102 as shown in FIG. 10.

According to the sixth embodiment, the battery 15 is built in the top tube 102, thus increasing the freedom of design of the down tube 103. In addition, the battery 15 is built in the top tube 102, and therefore, is stealable less easily.

Figure 11:
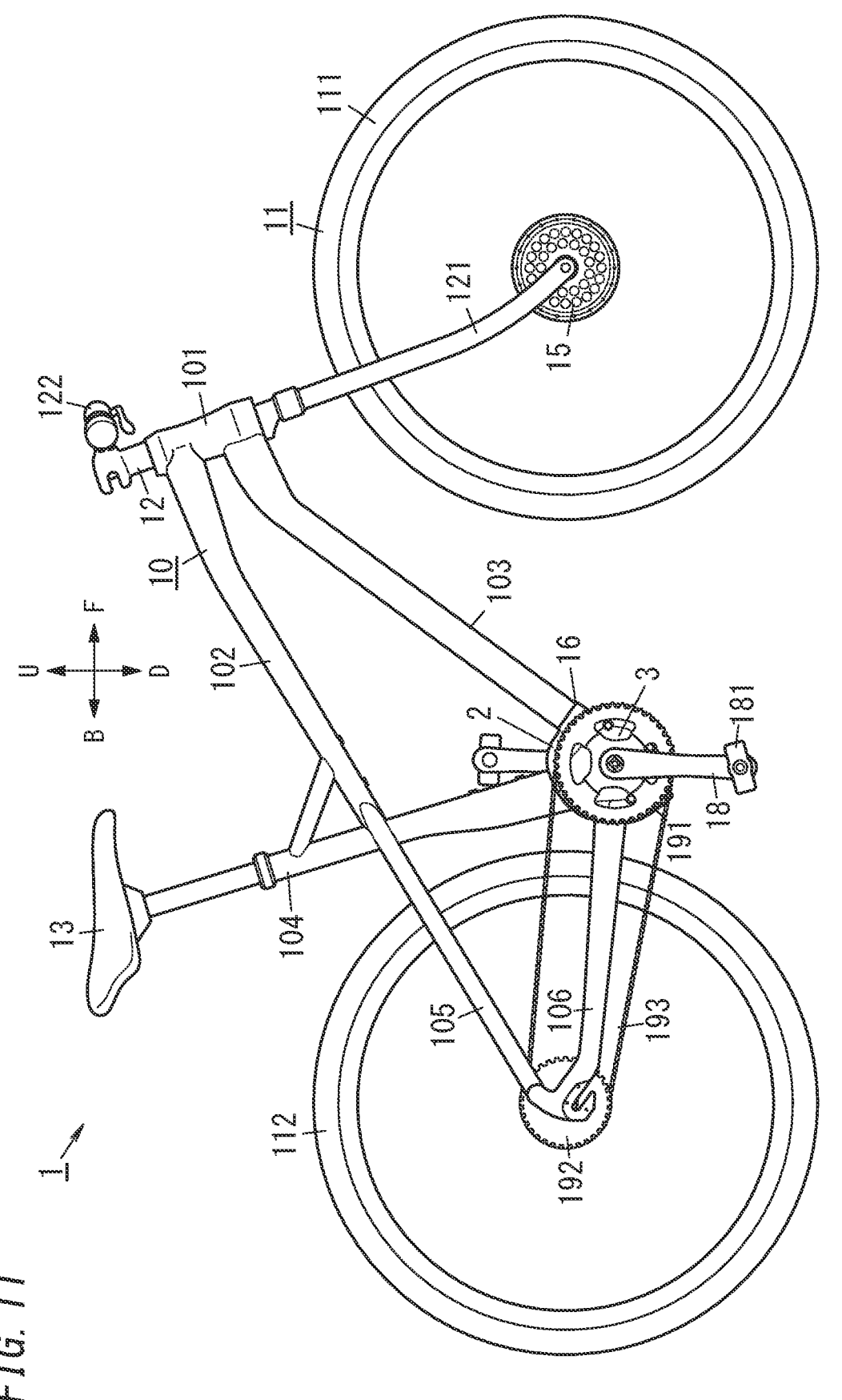
FIG. 11 is a side view of an electric bicycle according to a seventh embodiment.

Next, a motor unit 3 according to a seventh embodiment will be described with reference to FIG. 11. The motor unit 3 according to the seventh embodiment is mostly the same as the motor unit 3 according to the first embodiment. Thus, description of their common features will be omitted herein and the following description will be focused on their differences.

In the first embodiment described above, the battery 15 is loaded into the down tube 103 as shown in FIG. 2. On the other hand, in the seventh embodiment, the battery 15 is provided for a hub of the front wheel 111 as shown in FIG. 11. This increases the freedom of design of the frame 10.

Figure 12:
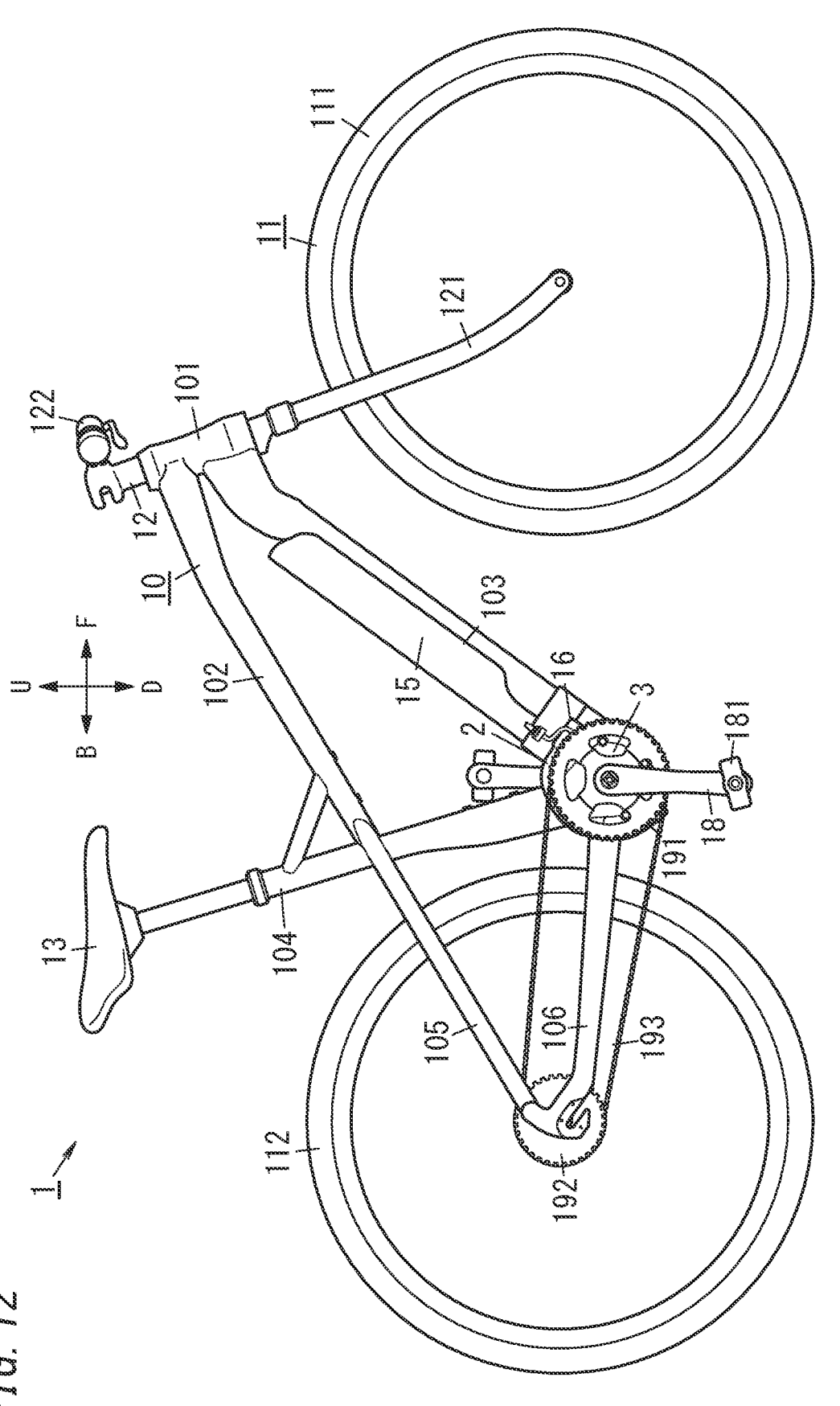
FIG. 12 is a side view of an electric bicycle according to an eighth embodiment.
Figure 13:
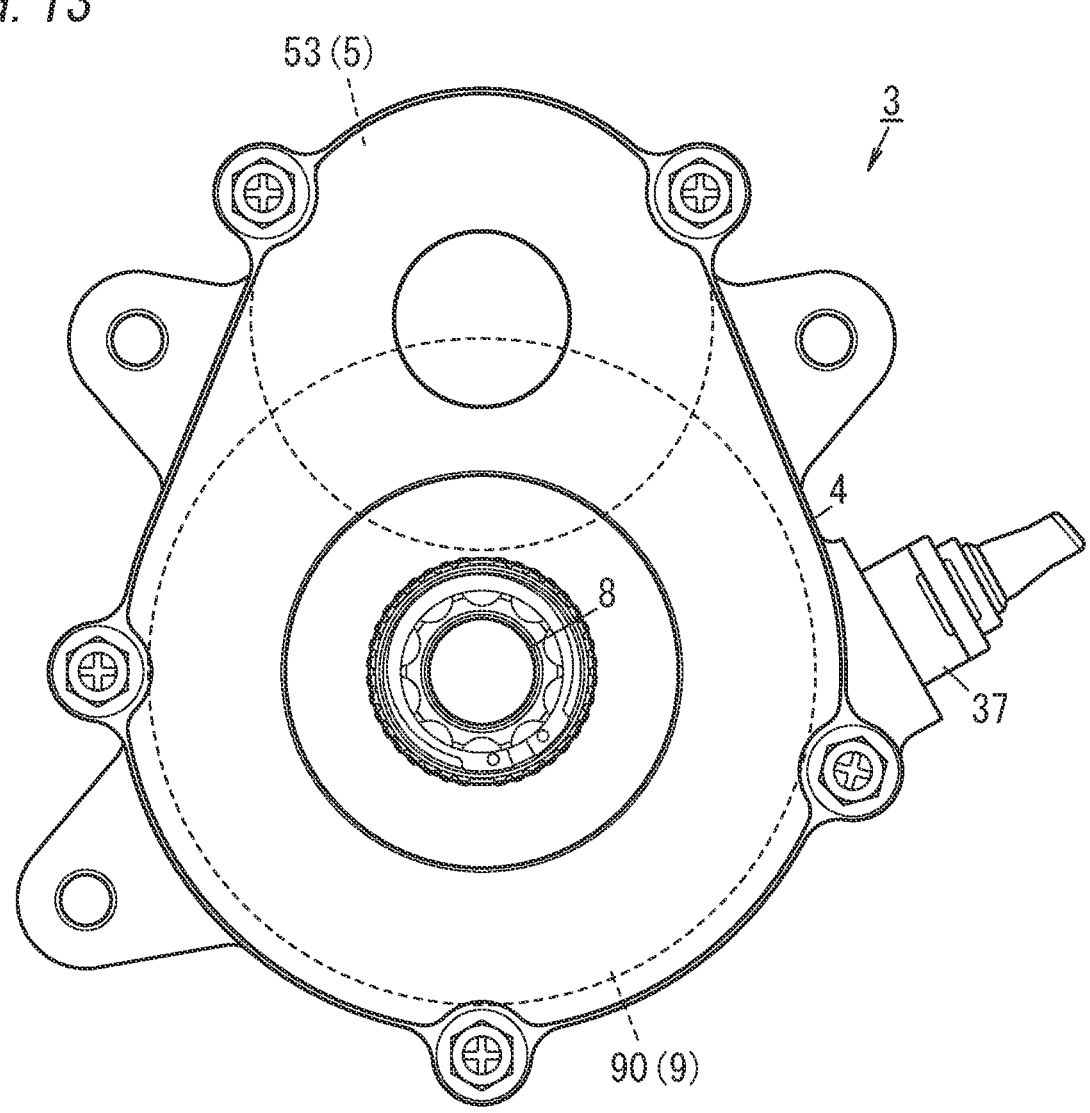
FIG. 13 is a side view of a motor unit of the electric bicycle.

Next, a motor unit 3 according to an eighth embodiment will be described with reference to FIGS. 12 and 13. The motor unit 3 according to the eighth embodiment is mostly the same as the motor unit 3 according to the first embodiment. Thus, description of their common features will be omitted herein and the following description will be focused on their differences.

In the first embodiment described above, the rotary shaft 51 of the motor 5 is located over the axis 600 and backward of the axis 600 in the traveling direction of the electric bicycle 1 as shown in FIG. 2. On the other hand, in the eighth embodiment, the rotary shaft 51 of the motor 5 is located over the axis 600 and forward of the axis 600 in the traveling direction of the electric bicycle 1 as shown in FIG. 12. A cable connected to the battery 15 is connected to a connector 37 of the motor unit 3 as shown in FIG. 13. The connector 37 is provided for a side portion of the case 4.

The eighth embodiment makes it easier to shorten the distance between the battery 15 and the motor 5 and thereby shorten the cable length.

Figure 14:
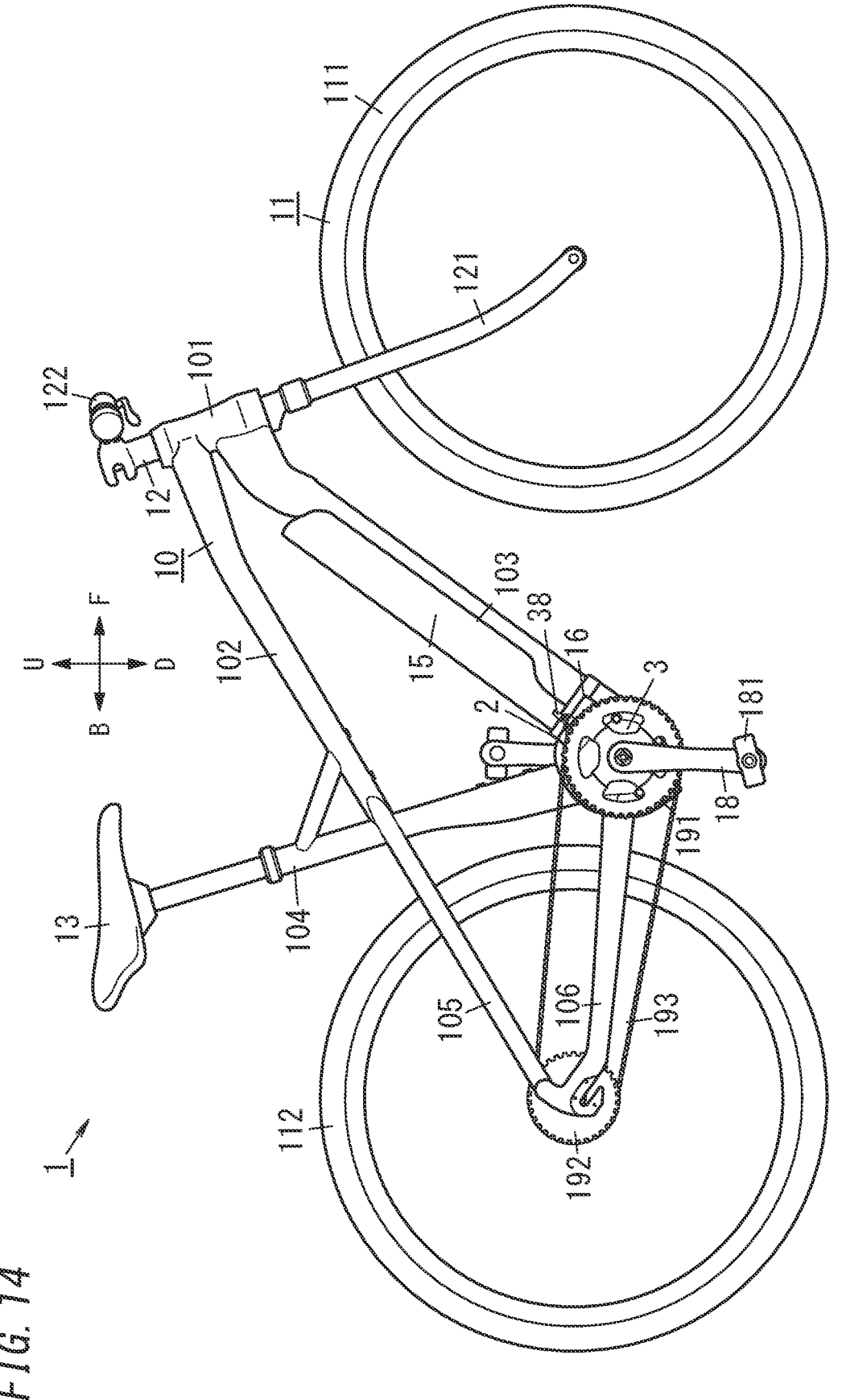
FIG. 14 is a side view of an electric bicycle according to a ninth embodiment.

Next, a motor unit 3 according to a ninth embodiment will be described with reference to FIG. 14. The motor unit 3 according to the ninth embodiment is mostly the same as the motor unit 3 according to the first embodiment. Thus, description of their common features will be omitted herein and the following description will be focused on their differences.

In the first embodiment described above, the rotary shaft 51 of the motor 5 is located over the axis 600 and backward of the axis 600 in the traveling direction of the electric bicycle 1 as shown in FIG. 2. On the other hand, in the ninth embodiment, the rotary shaft 51 of the motor 5 is located over the axis 600 and forward of the axis 600 in the traveling direction of the electric bicycle 1 as shown in FIG. 14. In addition, the motor unit 3 includes a terminal 38 to be connected to the battery 15 for supplying power to the motor unit 3.

According to the ninth embodiment, the battery 15 may be connected directly to the terminal 38 of the motor unit 3, thus eliminating the need to provide a cable for connecting the battery 15 to the motor unit 3. Note that this also contributes to, if the terminal 38 falls within the outline of the sprocket 191 when viewed in the axial direction 600, downsizing the motor unit 3. On the other hand, if the terminal 38 falls outside of the outline of the sprocket 191 when viewed in the axial direction 600, this may reduce the chances of the user's hands interfering with the sprocket 191 when the battery 15 is being loaded.

According to a variation of the exemplary embodiments described above, a one-way clutch may be interposed between the input body 7 and the output body 8. The one-way clutch is configured to, when rotational force is applied in the accelerating direction to the input body 7, transmit the rotational force to the output body 8 and is also configured to, when rotational force is applied in a direction opposite from the accelerating direction to the input body 7, not transmit the rotational force to the output body 8. Also, when the rotational force is applied in the accelerating direction to the output body 8, the one-way clutch does not transmit the rotational force to the input body 7.

Alternatively, a one-way clutch may be interposed between the input shaft 6 and the input body 7. In that case, the one-way clutch is configured to, when rotational force is applied in the accelerating direction to the input shaft 6, transmit the rotational force to the input body 7 and is also configured to, when rotational force is applied in a direction opposite from the accelerating direction to the input shaft 6, not transmit the rotational force to the input body 7. Also, when the rotational force is applied in the accelerating direction to the input body 7, the one-way clutch does not transmit the rotational force to the input shaft 6. Interposing the one-way clutch either between the input body 7 and the output body 8 or between the input shaft 6 and the input body 7 prevents, even if the sprocket 191 rotates in the accelerating direction, the input shaft 6 from turning along with the sprocket 191. This configuration is effectively applicable to a situation where the electric bicycle is propelled with only the driving force generated by the motor 5. Examples of such a situation where the electric bicycle is propelled with only the driving force generated by the motor 5 include a so-called "walk mode" in which the user walks the electric bicycle, for example.

As is clear from the foregoing description of embodiments and their variations, a motor unit (3) according to a first aspect includes: a case (4); a motor (5) housed in the case (4); an input shaft (6); an output body (8); and a speed reducer mechanism (9). The input shaft (6) penetrates through the case (4) in an axial direction (600) and is arranged to be rotatable around an axis (600) defining the axial direction (600). The output body (8) is arranged in the case (4) to be rotatable around the axis (600). The speed reducer mechanism (9) is housed in the case (4) and reduces a rotational speed of the motor (5) and transmits rotational force with the rotational speed thus reduced to the output body (8). The speed reducer mechanism (9) includes only one pair of gears meshing with each other.

The first aspect may reduce the chances of causing a decline in the power transmission efficiency of the speed reducer mechanism (9) and make it easier to increase the degree of quietness and downsize the case (4).

A second aspect may be implemented in conjunction with the first aspect. In the second aspect, the motor (5) is an inner rotor motor.

According to the second aspect, the motor (5) may be implemented as an inner rotor motor which is used widely.

A third aspect may be implemented in conjunction with the first or second aspect. In the third aspect, the motor unit (3) further includes a sprocket (191) attached to the output body (8). When viewed in the axial direction (600), an outline of the case (4) falls within an outline of the sprocket (191).

The third aspect not only improves the appearance of an electric bicycle (1) including the motor unit (3) but also increases the freedom of design of the electric bicycle (1).

A fourth aspect may be implemented in conjunction with any one of the first to third aspects. In the fourth aspect, the motor (5) includes a stator (53) having a diameter (531) equal to or less than 80 mm.

The fourth aspect makes it easier to downsize the motor (5) and the motor unit (3).

A fifth aspect may be implemented in conjunction with any one of the first to third aspects. In the fifth aspect, the motor (5) includes a stator (53) having a diameter (531) equal to or less than 70 mm.

The fifth aspect makes it even easier to downsize the motor (5) and the motor unit (3).

A sixth aspect may be implemented in conjunction with any one of the first to fifth aspects. In the sixth aspect, a pitch (511) between a rotary shaft (51) of the motor (5) and the output body (8) is equal to or less than 60 mm.

The sixth aspect makes it easier to downsize the case (4) (of the motor unit (3)).

A seventh aspect may be implemented in conjunction with any one of the first to fifth aspects. In the seventh aspect, a pitch (511) between a rotary shaft (51) of the motor (5) and the output body (8) is equal to or less than 55 mm.

The seventh aspect makes it even easier to downsize the case (4) (of the motor unit (3)).

An eighth aspect may be implemented in conjunction with any one of the first to seventh aspects. In the eighth aspect, the speed reducer mechanism (9) includes: a drive gear that turns integrally with a rotary shaft (51) of the motor (5); and a driven gear (90) that turns integrally with the output body (8). The driven gear (90) has a diameter (901) equal to or less than 110 mm.

The eighth aspect makes it easier to downsize the speed reducer mechanism (9) and the motor unit (3).

A ninth aspect may be implemented in conjunction with any one of the first to seventh aspects. In the ninth aspect, the speed reducer mechanism (9) includes: a drive gear that turns integrally with a rotary shaft (51) of the motor (5); and a driven gear (90) that turns integrally with the output body (8). The driven gear (90) has a diameter (901) equal to or less than 95 mm.

The ninth aspect makes it even easier to downsize the speed reducer mechanism (9) and the motor unit (3).

A tenth aspect may be implemented in conjunction with any one of the first to ninth aspects. In the tenth aspect, the speed reducer mechanism (9) includes: a drive gear that turns integrally with a rotary shaft (51) of the motor (5); and a driven gear (90) that turns integrally with the output body (8). A numerical number of teeth of the drive gear is equal to or less than nine.

The tenth aspect allows setting the gear reduction ratio defined by meshing between the drive gear and the driven gear (90) at a relatively large value, thus making it easier to achieve a desired gear reduction ratio even by single reduction and downsize the speed reducer mechanism (9) and the motor unit (3).

An eleventh aspect may be implemented in conjunction with any one of the first to ninth aspects. In the eleventh aspect, the speed reducer mechanism (9) includes: a drive gear that turns integrally with a rotary shaft (51) of the motor (5); and a driven gear (90) that turns integrally with the output body (8). A numerical number of teeth of the drive gear is equal to or less than four.

The eleventh aspect allows setting the gear reduction ratio defined by meshing between the drive gear and the driven gear (90) at an even larger value, thus making it even easier to achieve a desired gear reduction ratio even by single reduction and downsize the speed reducer mechanism (9) and the motor unit (3).

A twelfth aspect may be implemented in conjunction with any one of the first to eleventh aspects. In the twelfth aspect, the speed reducer mechanism (9) includes: a drive gear that turns integrally with a rotary shaft (51) of the motor (5); and a driven gear (90) that turns integrally with the output body (8). At least part of the driven gear (90) is made of a resin.

The twelfth aspect may reduce the chances of the driven gear (90) being worn and reduce the noise generated when the motor unit (3) is driven.

A thirteenth aspect may be implemented in conjunction with the twelfth aspect. In the thirteenth aspect, the resin is a polyacetal resin.

The thirteenth aspect may reduce the chances of the driven gear (90) being worn and reduce the noise generated when the motor unit (3) is driven.

A fourteenth aspect may be implemented in conjunction with any one of the first to thirteenth aspects. In the fourteenth aspect, the speed reducer mechanism (9) includes: a drive gear that turns integrally with a rotary shaft

(51) of the motor (5); and a driven gear (90) that turns integrally with the output body (8). A surface of the drive gear is subjected to shot peening, air blasting, plating, gear grinding, a rolling finish, or a forging finish or has a coating.

The fourteenth aspect may reduce the surface roughness of the drive gear and increase the surface slipperiness of the drive gear, thus reducing the frictional resistance between the drive gear and the driven gear (90), the noise generated when the motor unit (3) is driven, and the abrasion of the driven gear (90).

A fifteenth aspect may be implemented in conjunction with any one of the first to fourteenth aspects. In the fifteenth aspect, the motor unit (3) further includes a control board (35) and a motor rotation detection unit (36). The control board (35) includes a control unit that controls the motor (5). The motor rotation detection unit (36) detects a number of revolutions of a rotor (52) included in the motor (5). The motor rotation detection unit (36) is provided for the control board (35).

The fifteenth aspect eliminates the need to provide any connector or cable to connect the motor rotation detection unit (36) and the control board (35), thus making it easier to downsize the motor unit (3).

A sixteenth aspect may be implemented in conjunction with any one of the first to fifteenth aspects. In the sixteenth aspect, the motor unit (3) further includes a control board (35) and an input shaft rotation detection unit (34). The control board (35) includes a control unit that controls the motor (5). The input shaft rotation detection unit (34) detects a number of revolutions of the input shaft (6). The input shaft rotation detection unit (34) is provided for the control board (35).

The sixteenth aspect eliminates the need to provide any connector or cable to connect the input shaft rotation detection unit (34) and the control board (35), thus making it easier to downsize the motor unit (3).

A seventeenth aspect may be implemented in conjunction with any one of the first to sixteenth aspects. In the seventeenth aspect, the motor unit (3) further includes a torque detection unit (33). The torque detection unit (33) is disposed along a surface of the input shaft (6) to detect torque applied to the input shaft (6). The output body (8) and the input shaft (6) are fitted into each other via fitting portions (72, 81) configured as splines or serrations.

The seventeenth aspect reduces the chances of torque and bending moment being transmitted from the output body (8) to the input shaft (6), thus reducing the chances of detection of the torque applied to the input shaft (6) being affected by the torque and bending moment transmitted from the output body (8).

An eighteenth aspect may be implemented in conjunction with any one of the first to seventeenth aspects. In the eighteenth aspect, the motor unit (3) further includes a sprocket (191), a torque detection unit (33), an input shaft rotation detection unit (34), and a rotator (341). The sprocket (191) is attached to the output body (8) on either side in the axial direction (600). The torque detection unit (33) is arranged along a surface of the input shaft (6) to detect torque applied to the input shaft (6). The input shaft rotation detection unit (34) detects a number of revolutions of the input shaft (6). The rotator (341) is provided to make the input shaft rotation detection unit (34) detect the number of revolutions of the input shaft (6) and is mounted on the input shaft (6) to rotate integrally with the input shaft (6). The rotator (341) is located, in the axial direction (600), opposite from the sprocket (191) with respect to the torque detection unit (33).

The eighteenth aspect allows the rotator (341) to be disposed distant from the sprocket (191), thus increasing the freedom of design.

A nineteenth aspect may be implemented in conjunction with any one of the first to seventeenth aspects. In the nineteenth aspect, the motor unit (3) further includes a sprocket (191), a torque detection unit (33), an input shaft rotation detection unit (34), and a rotator (341). The sprocket (191) is attached to the output body (8) on either side in the axial direction (600). The torque detection unit (33) is arranged along a surface of the input shaft (6) to detect torque applied to the input shaft (6). The input shaft rotation detection unit (34) detects a number of revolutions of the input shaft (6). The rotator (341) is provided to make the input shaft rotation detection unit (34) detect the number of revolutions of the input shaft (6) and is mounted on the input shaft (6) to rotate integrally with the input shaft (6). The rotator (341) and the sprocket (191) are located, in the axial direction (600), on an identical side with respect to the torque detection unit (33).

The nineteenth aspect allows the rotator (341) to be disposed near the sprocket (191), thus increasing the freedom of design.

A twentieth aspect may be implemented in conjunction with any one of the first to nineteenth aspects. In the twentieth aspect, the pair of gears included in the speed reducer mechanism (9) are helical gears.

The twentieth aspect increases not only the durability of the pair of gears included in the speed reducer mechanism (9) but also their contact ratio and the degree of quietness as well.

A twenty-first aspect may be implemented in conjunction with any one of the first to twentieth aspects. In the twenty-first aspect, the motor unit (3) includes a terminal (38) to be connected to a battery (15) that supplies power to the motor unit (3).

The twenty-first aspect eliminates the need to provide any cable to connect the battery (15) to the motor unit (3).

A twenty-second aspect may be implemented in conjunction with any one of the first to twenty-first aspects. In the twenty-second aspect, an electric bicycle (1) includes the motor unit (3) according to any one of the first to twenty-first aspects.

The twenty-second aspect may reduce the chances of causing a decline in the power transmission efficiency of the speed reducer mechanism (9) and make it easier to increase the degree of quietness and downsize the case (4).

A twenty-third aspect may be implemented in conjunction with the twenty-second aspect. In the twenty-third aspect, a rotary shaft (51) of the motor (5) is located over the axis (600) and backward of the axis (600) in a traveling direction of the electric bicycle (1).

The twenty-third aspect makes it easier to align the case (4) with a seat tube (104).

A twenty-fourth aspect may be implemented in conjunction with the twenty-second aspect. In the twenty-fourth aspect, a rotary shaft (51) of the motor (5) is located under the axis (600).

The twenty-fourth aspect increases the freedom of design.

A twenty-fifth aspect may be implemented in conjunction with any one of the twenty-second to twenty-fourth aspects. In the twenty-fifth aspect, the electric bicycle (1) includes: a battery (15) that supplies power to the motor unit (3); and a frame (10) including a top tube (102), a down tube (103), and a seat tube (104). The battery (15) is built in the seat tube (104).

According to the twenty-fifth aspect, the battery (15) is built in the seat tube (104), thus increasing the freedom of design of the down tube (103).

A twenty-sixth aspect may be implemented in conjunction with any one of the twenty-second to twenty-fourth aspects. In the twenty-sixth aspect, the electric bicycle (1) includes: a battery (15) that supplies power to the motor unit (3); and a frame (10) including a top tube (102), a down tube (103), and a seat tube (104). The battery (15) is built in the top tube (102).

According to the twenty-sixth aspect, the battery (15) is built in the top tube (102), thus increasing the freedom of design of the down tube (103).

REFERENCE SIGNS LIST

1 Electric Bicycle
10 Frame
102 Top Tube
103 Down Tube
104 Seat Tube
15 Battery
191 Front Sprocket
3 Motor Unit
33 Torque Detection Unit
34 Input Shaft Rotation Detection Unit
341 Rotator
35 Control Board
36 Motor Rotation Detection Unit
38 Terminal
4 Case
5 Motor
51 Rotary Shaft
511 Pitch
52 Rotor
53 Stator
531 Diameter
6 Input Shaft
600 Axis
8 Output Body
9 Speed Reducer Mechanism
90 Driven Gear
901 Diameter
91 Gear Part

The invention claimed is:

1. A motor unit comprising:
a case;
a motor housed in the case;
an input shaft penetrating through the case in an axial direction and arranged to be rotatable around an axis defining the axial direction;
an output body arranged in the case to be rotatable around the axis; and
a speed reducer mechanism housed in the case and configured to reduce a rotational speed of the motor and transmit rotational force with the rotational speed thus reduced to the output body, and
a sprocket attached to the output body,
the speed reducer mechanism including only one pair of gears meshing with each other, and
when viewed in the axial direction, an entire outline of the case falls within an outline of the sprocket.

2. The motor unit of claim 1, wherein
the motor is an inner rotor motor.

3. The motor unit of claim 1, wherein
the motor includes a stator having a diameter equal to or less than 80 mm.

4. The motor unit of claim 1, wherein
a pitch between a rotary shaft of the motor and the output body is equal to or less than 60 mm.

5. The motor unit of claim 1, wherein
the speed reducer mechanism includes: a drive gear configured to turn integrally with a rotary shaft of the motor; and a driven gear configured to turn integrally with the output body, and
the driven gear has a diameter equal to or less than 110 mm.

6. The motor unit of claim 1, wherein
the speed reducer mechanism includes: a drive gear configured to turn integrally with a rotary shaft of the motor; and a driven gear configured to turn integrally with the output body, and
a numerical number of teeth of the drive gear is equal to or less than nine.

7. The motor unit of claim 1, wherein
the speed reducer mechanism includes: a drive gear configured to turn integrally with a rotary shaft of the motor; and a driven gear configured to turn integrally with the output body, and
at least part of the driven gear is made of a resin.

8. The motor unit of claim 1, wherein
the speed reducer mechanism includes: a drive gear configured to turn integrally with a rotary shaft of the motor; and a driven gear configured to turn integrally with the output body, and
a surface of the drive gear is subjected to shot peening, air blasting, plating, gear grinding, a rolling finish, or a forging finish or has a coating.

9. The motor unit of claim 1, further comprising:
a control board having a control unit configured to control the motor; and
a motor rotation detection unit configured to detect a number of revolutions of a rotor included in the motor, wherein
the motor rotation detection unit is provided for the control board.

10. The motor unit of claim 1, further comprising:
a control board having a control unit configured to control the motor; and
an input shaft rotation detection unit configured to detect a number of revolutions of the input shaft, wherein
the input shaft rotation detection unit is provided for the control board.

11. The motor unit of claim 1, further comprising a torque detection unit arranged along a surface of the input shaft to detect torque applied to the input shaft, wherein
the output body and the input shaft are fitted into each other via fitting portions configured as splines or serrations.

12. The motor unit of claim 1, further comprising:
a torque detection unit arranged along a surface of the input shaft to detect torque applied to the input shaft;
an input shaft rotation detection unit configured to detect a number of revolutions of the input shaft; and
a rotator mounted on the input shaft and configured to rotate integrally with the input shaft to make the input shaft rotation detection unit detect the number of revolutions of the input shaft, wherein
the rotator is located, in the axial direction, opposite from the sprocket with respect to the torque detection unit.

13. The motor unit of claim 1, further comprising:
a torque detection unit arranged along a surface of the input shaft to detect torque applied to the input shaft;

an input shaft rotation detection unit configured to detect a number of revolutions of the input shaft; and a rotator mounted on the input shaft and configured to rotate integrally with the input shaft to make the input shaft rotation detection unit detect the number of revolutions of the input shaft, wherein the rotator and the sprocket are located, in the axial direction, on an identical side with respect to the torque detection unit.

14. The motor unit of claim 1, comprising a terminal to be connected to a battery configured to supply power to the motor unit.

15. An electric bicycle comprising the motor unit of claim 1.

16. The electric bicycle of claim 15, wherein a rotary shaft of the motor is located over the axis and backward of the axis in a traveling direction of the electric bicycle.

17. The electric bicycle of claim 15, wherein a rotary shaft of the motor is located under the axis.

18. The electric bicycle of claim 15, comprising:

a battery configured to supply power to the motor unit; and a frame including a top tube, a down tube, and a seat tube, wherein the battery is built in the seat tube.

19. The electric bicycle of claim 15, comprising:

a battery configured to supply power to the motor unit; and a frame including a top tube, a down tube, and a seat tube, wherein the battery is built in the top tube.

\* \* \* \* \*